United States Patent Office 3,527,466
Patented Sept. 8, 1970

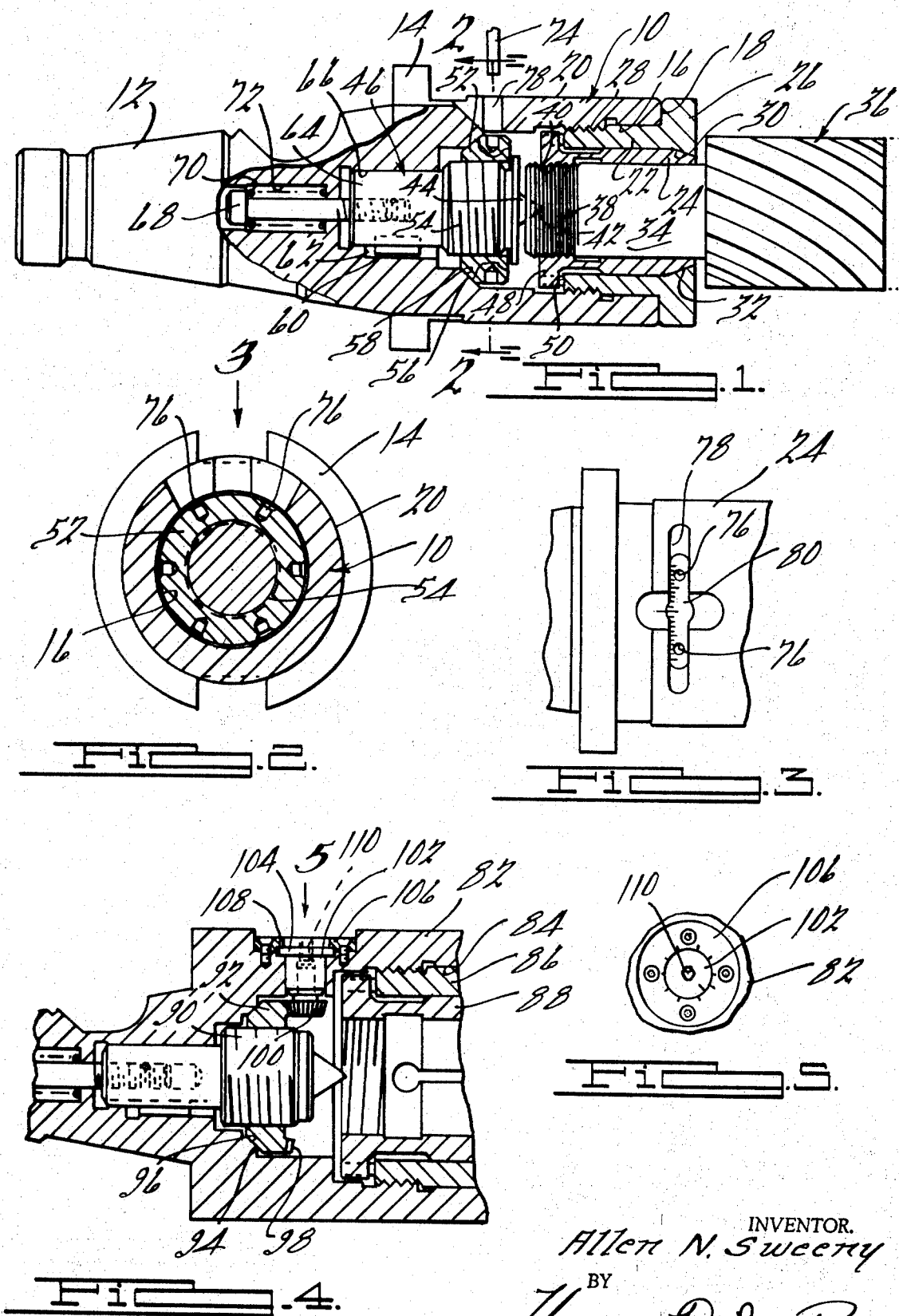

3,527,466
AXIALLY ADJUSTABLE CHUCK
Allen N. Sweeny, Grosse Pointe Farms, Mich., assignor to Devlieg Machine Company, Royal Oak, Mich., a corporation of Michigan
Filed Nov. 25, 1968, Ser. No. 778,719
Int. Cl. B23b 31/20
U.S. Cl. 279—53                                                7 Claims

ABSTRACT OF THE DISCLOSURE

A chuck having a collet for gripping the cylindrical shank of a rotary metal cutting tool. Any slippage or rotation of the tool within the chuck is operable to increase the gripping force of the collet on the tool shank. The tool is seated in the chuck body against an adjustable seat.

SUMMARY OF THE INVENTION

Modern machine tools frequently employ numerical controls by which various functions or movements of the machine are controlled in accordance with information contained on punch cards, tape, or other data storage media. One of the movements which is subject to programming for numerical control is the axial movement of the tool spindle. This, of course, determines the depth of a cut made with a tool carried by the spindle. When this movement is programmed it is necessary to know the exact location of the cutting edge or edges of the tool relative to a reference plane on the spindle. This information may be determined empirically for a given tool and the machine programmed accordingly. However, when a cutting edge is reground its axial position is changed slightly. It, therefore, becomes necessary either to change the information on the data storage medium or to readjust the axial position of the cutting edge in order to maintain the same depth of cut. The latter approach is more practical and is ordinarily achieved by adjusting the axial position of the tool within a chuck, tool holder, or other structure by which the tool is supported on the spindle. Tool supporting devices having the ability to vary the axial position of the tool which they support are normally called "axially adjustable."

It is an object of the present invention to provide an "axially adjustable" chuck of a type having a collet which grips the cylindrical periphery of a tool shank. Other objects of the present invention are the provision of an axially adjustable chuck which possesses a high degree of accuracy, which maintains a precise axial alignment of the tool, which is convenient to use, which may be manufactured at a reasonable cost, which is reliable in operation, which holds its axial position against accidental movement, which is strong and reliable in operation, and which lends itself for use with a relatively simple type of tool shank.

The foregoing objects are achieved by an axially adjustable tool chuck characterized by the provision of a collet received within the forward end of a cavity formed in a chuck body. Positioned within the cavity behind the collet is an adjustable seat which is threaded into an adjusting collar. The adjusting collar, in turn, seats against a locating surface formed on the chuck body within the cavity. A locking or retaining device is engageable with the tool seat to apply a rearward force thereto and hold the adjusting collar against its locating surface.

DESCRIPTION OF THE VIEWS OF THE DRAWINGS

FIG. 1 is a view partly in longitudinal section and partly in elevation of a chuck made according to the present invention, the chuck being shown holding a typical tool;

FIG. 2 is a sectional view of the structure illustrated in FIG. 1 taken on the line 2—2 of FIG. 1;

FIG. 3 is a side elevational view of the structure illustrated in FIGS. 1 and 2, looking in the direction of the arrow 3 of FIG. 2;

FIG. 4 is a fragmentary sectional view of a chuck illustrating another form of the present invention; and FIG. 5 is a fragmentary side elevational view of the structure illustrated in FIG. 4 looking in the direction of the arrow 5 thereof.

DETAILED DESCRIPTION OF THE PREFERRED EMBODIMENT

Referring now to the drawings and particularly to FIG. 1, a chuck body, indicated generally at 10, is illustrated as having a shank portion 12, a conventional driving flange 14, and a cavity 16 which is open to the front end 18 of the body 10. The cavity 16 is generally symmetrical about the longitudinal axis of the tool, as is an outer peripheral surface 20 of the chuck body 10.

Positioned within the cavity 16 are a sleeve 22 and a split collet 24. The sleeve 22 has a radially outwardly extending annular flange 26 which abuts the forward end 18 of the chuck body 10. The sleeve 22 is threaded into the cavity 16, as indicated at 28, and remains fixed in position with respect to the chuck body 10 throughout the use of the device. A conical or tapered annular surface 30 is formed at the forward end of the sleeve 22 and conformably engages a conical or tapered nose portion 32 of the split collet 24. Upon forward movement of the collet 24 relative to the sleeve 22 the collet is forced radially inwardly into clamping engagement with the cylindrical shank 34 of a cutting tool 36. It will be seen that the cutting tool shank 34 has a threaded portion 38 at its rear end which is threaded into a threaded portion 40 formed at the rear end of the collet 24. The rear end of the tool shank 34 has a conical recess 42 which receives a conical dead center or abutment surface 44 of a seat member 46. The collet 24 is provided with a pair of diametrically opposite keys or radially outwardly extending projections 48 which are fitted within slots or keyways 50 of the sleeve 22 to prevent relative rotation of the collet as the tool shank 34 is threaded into it. The tool shank 34 is threaded into the collet 24 until it seats against the seat member 46. Continued rotation of the shank 34 will move the collet 24 forwardly causing the conical surface 30 of the sleeve 22 to force the collet 24 radially inwardly into increasingly tighter gripping engagement with the tool shank 34.

The axial position of the tool 36 relative to the chuck body 10 is controlled by the position of the seat member 46. This position may be adjusted by rotation of an adjusting collar 52 which is threaded onto a threaded portion 54 of the seat member 46. The collar 52 has an annular conical seating surface 56 which seats against or engages an annular locating surface 58 formed on the chuck body 10 within the cavity 16. The seat member 46 has a key 60 which slides within an axially extending keyway 62 of the cavity 16. The seat member 46 also has a cylindrical portion 64 which is closely fitted within a bore 66 forming a rearward extension of the cavity 16. The bore 66 and the collar 52 cooperate to hold the seat member 46 in very accurate concentric relationship with the axis of rotation of the entire chuck body 10. As is apparent from the drawings, the collar 52, the seat 46, the center 44, the bore 66, and the locating surface 58 are all concentric about the axis of rotation of the chuck.

The seat member cylindrical portion 64 is threadably engaged by a locking screw 68 which is inserted into it from the rear end of the chuck body 10. The locking screw 68 is biased rearwardly by a coil spring 70 seated within a bore 72 of the chuck body 10. Accordingly, the spring 70 holds the conical surface 56 of the collar 52 against the locating surface 58 of the chuck body 10.

From the foregoing, it will be appreciated that rotation of the adjusting collar 52 will produce axial movement of the seat member 46 inasmuch as the seat member is held against rotation by its key 60. Such rotation of the adjusting collar 52 is accomplished by a simple rod-like tool 74 which is inserted into any one of a plurality of radially outwardly open bores 76 drilled in the outer periphery of the adjusting collar 52. The tool 74 is inserted through a slot 78 formed in the chuck body 10 and extending from the cavity 16 to the outer peripheral surface 20 of the chuck body. The tool 74 is inserted into one of the bores 76 and is then moved in rotation to bring a next adjacent bore 76 into a position where it is accessible to the tool 74. It will be noted that as the adjusting collar 52 is rotated and the seat member 46 is moved axially, the spring 70 will yield. It will be appreciated that the degree of movement of the seat member 46 necessary to compensate for a regrinding of the cutting tool 36 is not very great. As seen in FIG. 3, the outer periphery 80 of the adjusting collar 52 may be graduated so that the amount of adjustment imparted to the seat member 46 can be accurately regulated. Of course, the adjustment of the seat member 46 is accomplished with the tool 36 released from its operating position.

A slightly modified form of the present invention is illustrated in FIGS. 4 and 5 and includes a chuck body 82 having a cavity 84 which receives a sleeve 86 and collet 88 identical to the sleeve 22 and collet 24. The tool illustrated in FIGS. 4 and 5 employs an adjustable seat member 90 which is threadably engaged by an adjusting collar 92 having a conical seat surface 94 seated against a locating surface 96 formed in the cavity 84 of the chuck body 82. The adjusting collar 92 has bevel gear teeth 98 formed on its forward side which are engageable by a bevel gear pinion 100. The pinion gear 100 is formed at one end of a cylindrical member 102 having a flange 104 which is rotatably trapped between an annular retainer 106 and an annular shoulder 108 of the chuck body 82. Upon insertion of an Allen wrench, or the like, into an opening 110 of the cylindrical member 102, rotation of the bevel gear pinion 100 is produced to effect rotation of the adjusting collar 92 about the longitudinal axis of the chuck body 10. As seen in FIG. 5, the retainer 106 is graduated for accurately determining the extent of movement of the seat member 90.

In both illustrated embodiments of the invention, it will be apparent that the adjusting collar which positions the seat may be adjusted from a position lateraly of the chuck body by access provided through the wall of the chuck body. This, of course, renders the adjustment of the seat highly convenient as well as extremely accurate. The arrangement of the adjusting collar is such as to hold the tool accurately centered as well as axially fixed.

What is claimed is:

1. An axially adjustable chuck including a chuck body having a mounting portion at one end thereof and a cavity open to the other end thereof and operable to receive the shank of a tool, a collet disposed in said cavity and operable to grip a tool shank, means for producing clamping of said collet on the tool shank, an adjustable seat against which a tool shank is seated in said cavity, said adjustable seat having an external thread, an adjusting collar threadably engageable with said seat thread, an annular locating surface formed in said cavity inwardly of said collet, said locating surface being engageable with said adjusting collar to locate said collar axially of said chuck body, means operable to prevent rotation of said seat while permitting axial movement thereof, and means for holding said collar against said abutment surface.

2. The structure set forth in claim 1 including an opening formed in the side of said chuck body providing lateral access to said collar for rotation of said collar.

3. The structure set forth in claim 2 including a plurality of radially outwardly facing openings formed in said collar and accessible to a tool inserted through said opening.

4. The structure set forth in claim 2 including gear teeth formed on said collar and a pinion positioned in said chuck body opening engageable with the gear teeth of said collar.

5. The structure set forth in claim 1 wherein said locating surface is of annular conical shape and wherein said collar has a conical surface engageable with said locating surface.

6. The structure set forth in claim 5 including interengaging conical surfaces on said seat and on the tool shank operable to hold said tool shank centered with respect to said seat.

7. The structure set forth in claim 1 wherein said last named means comprises a spring biased screw threadably engaging said seat.

References Cited

UNITED STATES PATENTS 807,487 12/1905 McClellan.
3,385,607 5/1968 Hughes _____ 279—51

FOREIGN PATENTS 848,563 9/1960 Great Britain.

ROBERT C. RIORDON, Primary Examiner
D. D. EVENSON, Assistant Examiner